United States Patent Office 3,751,329
Patented Aug. 7, 1973

3,751,329
POROMERIC MATERIALS
Giorgio Fonzi, Saronno, Teo Paleologo, Milan, and Giorgio Toso, Gallarate, Italy, assignors to Societa Italiana Resine S.p.A., Milan, Italy
No Drawing. Filed June 30, 1971, Ser. No. 158,609
Claims priority, application Italy, July 1, 1970, 26,848/70
Int. Cl. B32b 3/26
U.S. Cl. 161—159                        8 Claims

ABSTRACT OF THE DISCLOSURE

Poromeric materials, particularly leather substitutes, have a non-woven backing and a microporous polyurethane film facing, the intermediate layer being a foam coagulated from a dispersion containing more than 45% resin by weight and air in a volumetric ratio dispersion to air of 1:2 to 2:1.

---

The present invention relates to poromeric materials adapted for use in the footwear and leather goods field. More particularly, the present invention relates to poromeric materials constituted essentially by a non-woven fabric, a coagulated foam and a polyurethane covering. The manufacture of poromeric synthetic materials adapted for use in the footwear field is already described in U.S. Pat. No. 2,723,935.

By virtue of their properties which are very similar to those of natural leather (breathing, good resistance to ageing and wear, non-deformability, opacity and ease of cleaning), such materials may be worked with the conventional footwear-making apparatus, particularly in the manufacture of uppers, no particular ploblems arising in soling and finishing.

In contrast to leather, however, where each skin differs in thickness, strength and natural features, the uniform properties of poromeric materials facilitate cutting, simplify operations and minimise wastage.

The object of the present invention is poromeric materials which, in addition to having the characteristic features of known poromeric materials, are characterised by improved properties of permeability to gases and vapours, elastic return and quality of "feel" and softness and far lower capacity for absorption of water.

Such poromeric materials are obtained extremely economically, easily and rapidly by systems which can be automated, by association of a non-woven fabric, a coagulated foam and a thin film of microporous polyurethane.

More precisely, the poromeric materials which are the object of the present invention are laminates constituted in cross-section by a non-woven fabric which acts as a backing, a coagulated foam which constitutes the intermediate layer and a thin layer of micro-porous polyurethane film which acts as the surface covering.

One of the essential aspects of the present invention is the presence of a coagulated foam within the poromeric material.

Such coagulated foams are obtained by subjecting to coagulation the foams produced by enclosing in aqueous latices, in an homogeniser, air in quantities such that the volumetric ratio of latex:air is comprised between 2:1 and 1:2 and is preferably around 1:1.

Various types of latex may be used according to the characteristic features which it is desired to impart to the poromeric material, latices being understood as meaning aqueous dispersions with a high concentration of resin.

The best results are obtained by using aqueous dispersions with a resin concentration above 45% and preferably comprised between 50 to 60% by weight. The presence of thickening agent permits the use also of latices with a concentration of less than 45% by weight.

As resins, it is possible for example to use acrylic, carboxylated acrylic, methacrylic, methyl methacrylic, polyamide, polyurethane, polyvinyl, polyviynlidene, butadiene, styrene-butadiene and nitrile resins as well as copolymers of the aforesaid, physical mixtures of the aforesaid and mixtures of more than one copolymer.

In addition, the resins in the latices may be present alone or in mixture with other substances capable of cross-linking together with them to form strong structures. In this latter case, the latex can act simply as a vehicle for such substances.

In the preferred embodiment of the present invention, latices of acrylic resins or modified acrylic resins are used alone or in mixture with other resins with a concentration of around 60% by weight.

Additives such as humectants, tensioactive substances, stabilisers, cross-linking agents, catalysts, foaming agents, etc., which are normally added to the latice themselves may also be present in the latices.

Coagulation of the foams thus produced is carried out by techniques already known for this purpose, for example by heating, gelification or irradiation.

By proceeding thus with the latices and using the above-described propertions of latex:air, it is possible to obtain coagulated foams with very small and numerous pores, these being uniformly and regularly distributed. In this way, the structure of the coagulated foam is such as to guarantee in the final poromeric material not only high levels of softness, suppleness and "feel" but also substantial breathing and elastic return characteristics. In the implementation of the invention, the aqueous latices, preferably acrylic latices, alone or in the presence of other compounds, as described above, are converted to foam by the enclosure of air in an homogeniser in the volumetric ratios of latex:air desired.

Such foams are then spread out onto a thin layer of micro-porous polyurethane film produced by already known techniques from polyurethane resins suitable for the purposes, in quantities comprised between 10 to 50 g. per sq. m. of surface area. The foam is coagulated on the polyurethane coating preferably in an oven with the temperature comprised between 90 and 160° C.

By means of a commercial adhesive, a non-woven fabric is finally glued onto the surface of the coagulated foam so as to obtain materials having a controlled density gradient, a smooth and waterproof outer surfaces and a comfortable and strong inner surface.

Such materials are then laminated, embossed, coloured and finished in order to give them the desired appearance.

In another form of embodiment of the present invention, the foam is spread directly onto the non-woven fabric in the above specified proportions and the microporous polyurethane surface coating is applied in a second stage onto the surface of the hardened foam. The methods of application may include gluing of already preformed microporous foils or that of forming the microporous foil directly on the surface of the hardened foam or that of distributing small particles of polyurethane by a thousand-point stamping machine or other methods known to men skilled in the art.

In another form of embodiment of the present invention, the foam is spread out both onto the non-woven fabric and onto a thin layer of microporous polyurethane film. After drying in an oven at a temperature between 50 and 70° C., both products are combined by being rolled in a calender under heat so that their foamy parts which are in contact adhere to each other and become completely integrated with each other.

The quantity of foam spread out onto the non-woven fabric and onto the polyurethane film should be such as to observe together the proportions set out above.

For the purposes of the present invention, considerable importance is also attributed to the use of non-woven fabrics, both for their backing function and for the mechanical strength and comfort which they impart to the final poromeric material.

Non-woven fabrics are understood as being those materials known in the art which are not produced by the known method of producing fabrics, in other words by means of interwoven warp and weft, but by the fixing of a fibre fleece. The fibres used may be natural fibres (for example cotton, wool) or artificial fibres (for example rayon) or synthetic fibres (for example polyamide, acrylic, polyester fibres) alone or in mixture inter se.

The thickness of the non-woven fabrics should be comprised between 0.2 and 2.5 mm. and preferably 0.4 to 1.2 mm., while the density of the fleece may be fairly widely varied, but is preferably comprised between 0.40 and 0.50 g. per cu. cm.

The superficial microporous polyurethane coating gives the poromeric material waterproofing properties, resilience to abrasion and, after appropriate processing, the smooth, grained, nap type outward appearance.

The fundamental characteristic feature of the poromeric materials thus produced is permability to gas and vapours of both the faces and the waterproofness of one face.

This permits of improved transpiration properties compared with the poromeric materials already known in the art, due to the presence of the vast number of tiny pores present in and regularly and uniformly distributed throughout the coagulated foam.

Further advantages over already known poromeric materials are the improved elastic return, "feel" and softness properties.

All these properties render the poromeric materials according to the present invention particularly suitable for use in the footwear and leather goods fields.

The poromeric materials which are the object of the present invention will now be described in greater detail in the following examples which are not however intended to imply any limitation on the invention itself.

EXAMPLE 1

Initially, the foam was produced. For this purpose, 300 g. of a 60% ethylene polyacrylate and methylolate polyacrylamide, in quantities such that their ratio was 9:1 by weight, were mixed with 15 g. of a cross-linking agent consisting of the product of condensation of melamine with formaldehyde (Aerotex of the American Cyanamide Co.), 25 g. of a polygolycol humectant (the commercial product Triton X–100), 5 g. polythiol ether polyether (the product Smulvin S of Bayer), 15 g. of a soapy solution to act as a foam-producing agent, 5 g. ammonium chloride, 5 g. of the Lipton dye of BASF and 120 g. ventilated kaolin. Air was introduced into the resultant product so that the volumetric ratio of liquid:air equalled approx. 3:2. Thus a thick and persistent foam was obtained which was spread out onto a non-woven fabric with a spatula so as to achieve a foam approx. 1 mm. thick.

The density of the non-woven fabric used was 0.45 g. per cc. while its thickness was 0.6 mm. and it had previously been suitably roughened on both surfaces to improve adhesion.

The non-woven fabric, spread with foam, after having been dried in an oven at a temperature comprised between 70 and 80° C., was subjected to calendering under heat to stabilise the foam and was then treated with hot air at 160° C. for three minutes.

The total thickness of the resultant product equalled 1:1 mm. Using thousand-point rollers, in a few passes, a thickness of 0.1 mm. of a polyurethane polymeric composition dissolved in dimethyl terephthalate (the product Estane of the Goodrich Company, dissolved in dimethyl terephthalate) was applied onto the product. The result, after removal of the dimethyl terephthalate by evaporation at low temperature, has the characteristic features set out in Table 1.

EXAMPLE 2

A foam was produced as in Example 1. Then a non-woven fabric was used which has a density of 0.45 g. per cc. and a thickness of 1 mm. which had been roughened on only one surface. Using a spatula, a uniform layer of foam with a thickness of some 0.8 mm. was applied to the surface which had not been roughened. After it had been dried in an oven at a temperature of between 60 and 70° C., the product was subjected to calendering under heat to stabilise the foam. Separately, using the usual technique, a polyurethane film 0.1 mm. thick was prepared on a transfer paper.

Onto this film, still carried on the transfer paper, a thin layer of the foam prepared as above was applied and the whole allowed to dry out at a temperature of 50 to 60° C.

By lamination in a calender under heat, this produce was then bonded to the product obtained from the non-woven fabric by application of the foam as above. The bonding was carried out in such a way that the foamy parts of the non-woven fabric and of the polyurethane film in contact adhered and became perfectly and permanently integrated with each other.

The product formed, after being treated with hot air at 160° C. for three minutes, was cooled and separated from the transfer paper which on the outside covered the polyurethane film. The resultant product, consisting in cross-section of a non-woven fabric, an intermediate layer of coagulated foam and a superficial polyurethane finish had the characteristic features set out in Table 1.

EXAMPLE 3

Initially, the foam was prepared. For this purpose, 150 g. of latex containing 46% ethyl polyacrylate and methylolate polyamide (weight ratio 9:1) were mixed with 150 g. acrylonitrile-butadiene latex containing 50% solids, 15 g. of a cross-linking agent consisting of the product of condensation of melamine with formaldehyde (Aerotex of the American Cyanamide Company), 25 g. of a polyglycol humectant (the commercial product Triton X–100), 5 g. of a polythioether polyether (the product Emulvin S by Bayer), 15 g. of a soapy solution, 5 g. ammonium chloride, 5 g. of the Lipton dye by BASF and 100 g. ventilated koalin. Air was introduced into the resultant product so that the volumetric ratio of liquid:air equalled approx. 2:1. Thus a thick and persistent film was obtained which was used as in Example 1.

The finished product exhibited the characteristic features set out in Table 1.

EXAMPLE 4

100 g. of styrene-butadiene latex containing 50% solids were mixed with 100 g. carboxylated acrylic latex containing 50% solids, 100 g. acrylonitrile-butadiene latex containing 50% solids, 10 g. of a cross-linking agent consisting of the product of condensation of melamine with formaldehyde (Aerotex by the American Cyanamide Company), 25 g. of a polyglycol humectant (the commercial product Triton X–100), 5 g. of a polythioether polyether (the product Emulvin S by Bayer), 20 g. of a soapy solution, 5 g. of ammonium chloride, 5 g. Lipton dye by BASF and 150 g. ventilated kaolin were mixed together. Air was introduced into the resultant product so that the volumetric ratio of liquid:air equalled approx. 1:1. Thus, a thick and persistent foam was obtained which was subsequently used as described in Example 1. Finally, the end product exhibited the characteristic features set out in Table 1.

EXAMPLE 5

300 g. of latex ABS were mixed with 25 g. of a polyglycol humectant (the commercial product Triton X-100), 5 g. of a polythioether polyether (the product Emulvin S by Bayer), 15 g. of a soapy solution, 5 g. of the Lipton dye of BASF and 200 g. of ventilated kaolin. Air was introduced into the resultant product so that the volumetric ratio of liquid:air equalled approx. 2.5:1.

The resultant foam was used as in Example 1. Finally, the finished product exhibited the characteristic features set out in Table 1.

EXAMPLE 6

A foam prepared as in Example 5 was used as in Example 2.

The finished product obtained exhibited the characteristic features set out in Table 1.

TABLE 1

| Characteristics | Example | | | | | |
|---|---|---|---|---|---|---|
| | 1 | 2 | 3 | 4 | 5 | 6 |
| Thickness, mm | 1.15 | 1.55 | 1.22 | 1.22 | 1.20 | 1.65 |
| Weight, g./sq. m | 600 | 850 | 650 | 720 | 700 | 875 |
| Specific weight, g./cu. cm | 0.52 | 0.55 | 0.54 | 0.59 | 0.58 | 0.53 |
| Traction (kg./cm.): | | | | | | |
| Longit | 11.5 | 13.2 | 12.1 | 11.8 | 11.3 | 12.2 |
| Transv | 10.4 | 11.8 | 10.4 | 10.5 | 10.1 | 11.5 |
| Elongation (percent): | | | | | | |
| Longit | 25 | 27 | 24 | 28 | 25 | 29 |
| Transv | 29 | 32 | 29 | 30 | 28 | 33 |
| Tearing strength (kg./mm.): | | | | | | |
| Longit | 2.1 | 2.0 | 2.1 | 2.1 | 2.0 | 2.0 |
| Transv | 2.2 | 2.2 | 2.1 | 2.2 | 2.2 | 2.1 |
| Fatigue resistance ×1,000 | >600 | >600 | >600 | >600 | >600 | >600 |
| Resistance to abrasion | 8 | 8 | 8 | 8 | 8 | 8 |
| Permeability to steam, mg./sq. cm. hr | 2.8 | 2.9 | 2.7 | 3.0 | 2.9 | 2.8 |
| Water absorption, percent | 40 | 43 | 44 | 41 | 44 | 4.3 |
| Resistance to water/hrs | >24 | >24 | >24 | >24 | >24 | >24 |

We claim:

1. Poromeric materials having improved elastic return and softness properties and which are gas-permeable consisting of:
   (1) a separate backing layer consisting of a non-woven fabric;
   (2) a separate intermediate layer bonded to said backing layer consisting of a coagulated synthetic resin foam having a large number of small pores uniformly distributed throughout said layer, said foam having been obtained from an aqueous latex dispersion of a synthetic resin containing at least 45 percent by weight of the resin and said coagulated foam containing air in an amount such that the volume ratio of said dispersion:air is from 2:1 to 1:2, and
   (3) a separate waterproof outer layer bonded to said intermediate layer consisting of a microporous polyurethene film.

2. Poromeric materials according to claim 1 wherein said synthetic resin is selected from the group consisting of acrylic resins, carboxylated acrylic resins, methacrylic resins, polyamide resins, polyurethene resins, polyvinyl resins, butadiene, styrene-butadiene resins, nitrile resins, mixtures thereof, copolymers thereof and mixtures of copolymers thereof.

3. Poromeric materials according to claim 1 wherein said latex contains said synthetic resin in an amount of from 50 to 60 percent by weight based on the weight of the latex and wherein the ratio by volume of said dispersion:air is about 1:1.

4. Poromeric materials according to claim 1 wherein said synthetic resin is selected from the group consisting of acrylic resins, modified acrylic resins and mixtures thereof with non-acrylic resins and wherein the resin is present in said latex in an amount of about 60 percent by weight based on the weight of the latex.

5. Poromeric materials according to claim 1 wherein said intermediate layer, prior to coagulation of said foam, is coated into said non-woven fabric backing in an amount of from 10 to 500 grams per square meter of backing.

6. Poromeric materials according to claim 1 wherein said intermediate layer, prior to coagulation of said foam, is coated onto said polyurethene film in an amount of from 10 to 500 grams per square meter of said film.

7. Poromeric materials according to claim 1 wherein said non-woven fabric backing consists of a fleece composed of a member selected from the group consisting of natural fibers, artificial fibers, synthetic fibers and mixtures thereof, wherein the thickness of said backing is from 0.2 to 2.5 millimeters and wherein the fleece density is from 0.4 to 0.5 gram per cubic centimeter.

8. Poromeric materials according to claim 7 wherein the thickness of said backing is from 0.4 to 1.2 millimeters.

References Cited
UNITED STATES PATENTS

| 3,501,326 | 3/1970 | Hochberg | 117—76 |
| 3,607,481 | 9/1971 | Shinohara | 156—148 |
| 3,654,066 | 4/1972 | Fukushima et al. | 161—160 |

WILLIAM J. VAN BALEN, Primary Examiner

U.S. Cl. X.R.

117—161 KP; 161—165, 170, Dig. 2